Dec. 26, 1950 M. C. GODDARD 2,535,675

RINGING CONTROL CIRCUIT

Filed Oct. 29, 1948 2 Sheets-Sheet 1

INVENTOR
M. C. GODDARD
BY P. C. Smith
ATTORNEY

Dec. 26, 1950 M. C. GODDARD 2,535,675

RINGING CONTROL CIRCUIT

Filed Oct. 29, 1948 2 Sheets-Sheet 2

INVENTOR
M. C. GODDARD
BY P. C. Smith
ATTORNEY

Patented Dec. 26, 1950 2,535,675

UNITED STATES PATENT OFFICE 2,535,675

RINGING CONTROL CIRCUIT

Myron C. Goddard, Garden City, N. Y., assignor to Bell Telephone Laboratories, Incorporated, New York, N. Y., a corporation of New York Application October 29, 1948, Serial No. 57,386

9 Claims. (Cl. 179—18)

Figure 1:
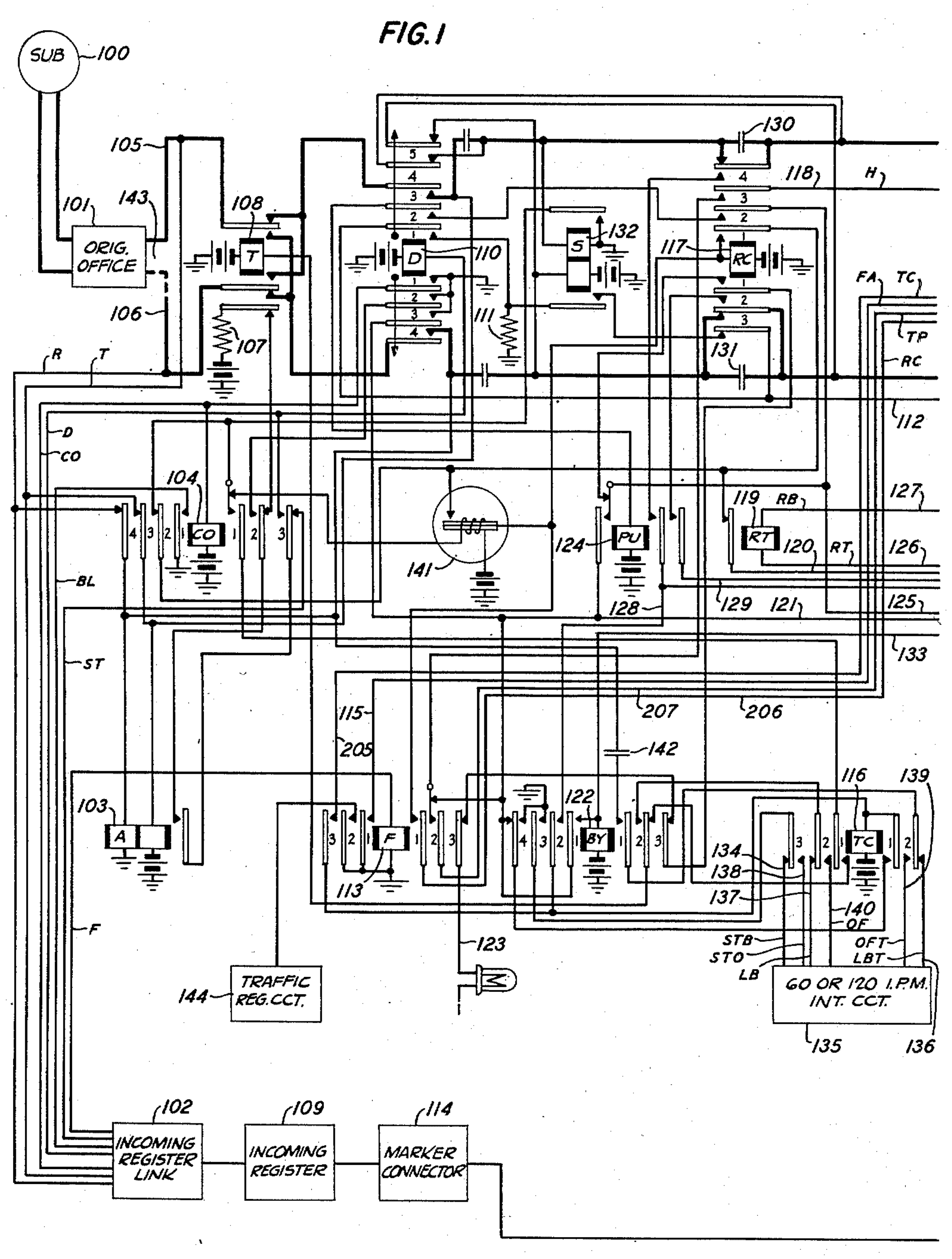

This invention relates to telephone systems in which connections between subscribers' lines are established by automatic equipment and more particularly to apparatus common to a plurality of trunk circuits and selectively operable to apply the type of ringing signal required to signal a called subscriber on a line of any type to which a connection has been extended over one of the trunk circuits.

The ringing and signaling apparatus to which the present invention is directed is particularly applicable to a telephone system of the so-called cross bar type disclosed in the application of A. J. Busch, Serial No. 57,394, filed concurrently herewith.

In a system of this type a marker is employed to control the operation of cross bar switches located on a line link frame and on a trunk link frame to select an idle channel extending from a desired subscriber's line to one end of an idle intra office trunk circuit which terminates at both of its ends at cross-points of cross bar switches on the trunk link frame if the call is to be terminated in the originating office. This selected channel is set up in accordance with the digits of the desired line number dialed by the calling subscriber. When such channel is selected and the marker finds the desired line to be idle, the marker then selects an idle channel extending from the calling line to the other end of the intra-office trunk circuit and operates cross bar switches on the line link frame on which the calling line terminates and on the trunk link frame on which the selected intra-office trunk circuit terminates in accordance with the selected channel to interconnect the calling and called lines.

Revertive calls to a called station from a calling station on the same line are made in a manner similar to an intra-office call except that a revertive call trunk is selected rather than an intra-office trunk circuit.

Calls from subscribers' lines terminating in distant offices for termination in a cross bar office of the type just described, enter such office over an incoming trunk circuit which terminates at a cross-point of a cross bar switch on a trunk link frame. When such incoming trunk circuit is seized an incoming register is associated therewith over a register link to receive the digit information necessary to enable the marker of the terminating office to control cross bar switches on the trunk link frame on which the incoming trunk circuit terminates and switches on the line link frame on which the desired or called line terminates to complete the connection from the incoming trunk circuit to the desired line.

In terminating a local call in a cross bar office which is established over an intra-office trunk circuit or revertive call trunk circuit or for a call from a distant office over an incoming trunk circuit, it is necessary to supply ringing current to the station of the called line in accordance with the type of line on which the called station is located. The line may be of the individual type, may be a two-party, a four-party semi-selective, a four-party full selective, an eight-party semi-selective, or a ten-party five-code line. Also, it is necessary on calls incoming from a distant office to inform the calling subscriber in the distant office if the called line is busy or if an all-paths-busy condition is encountered at the terminating office by the marker when attempting to select an idle channel over which a connection may be established from the incoming trunk circuit to the desired line.

It is the object of the present invention to provide equipment common to a plurality of trunk circuits of either the intra-office, revertive call or incoming type which may be selectively controlled by the marker to apply the required type of ringing signal to a called line or to cause the transmission of a busy signal to the calling line on a called-line-busy or all-paths-busy condition.

In accordance with the present invention this object is attained by the provision of a ringing selection switch circuit comprising a cross bar switch, which circuit is common to a group of trunks. The verticals of the switch are allocated to the several trunk circuits to which the circuit is common and the select magnets are selectively operable by a marker. Seven of the select magnets are selectively operable to determine the type of ringing signal to be applied to a trunk circuit, two of the select magnets are selectively operable to determine whether the ringing signal is to be applied to the tip or ring of the called line to ring a tip or ring party and a tenth select magnet is operable when the marker finds that it is necessary to transmit a busy signal over an inter-office trunk circuit to the calling line.

Figure 2:
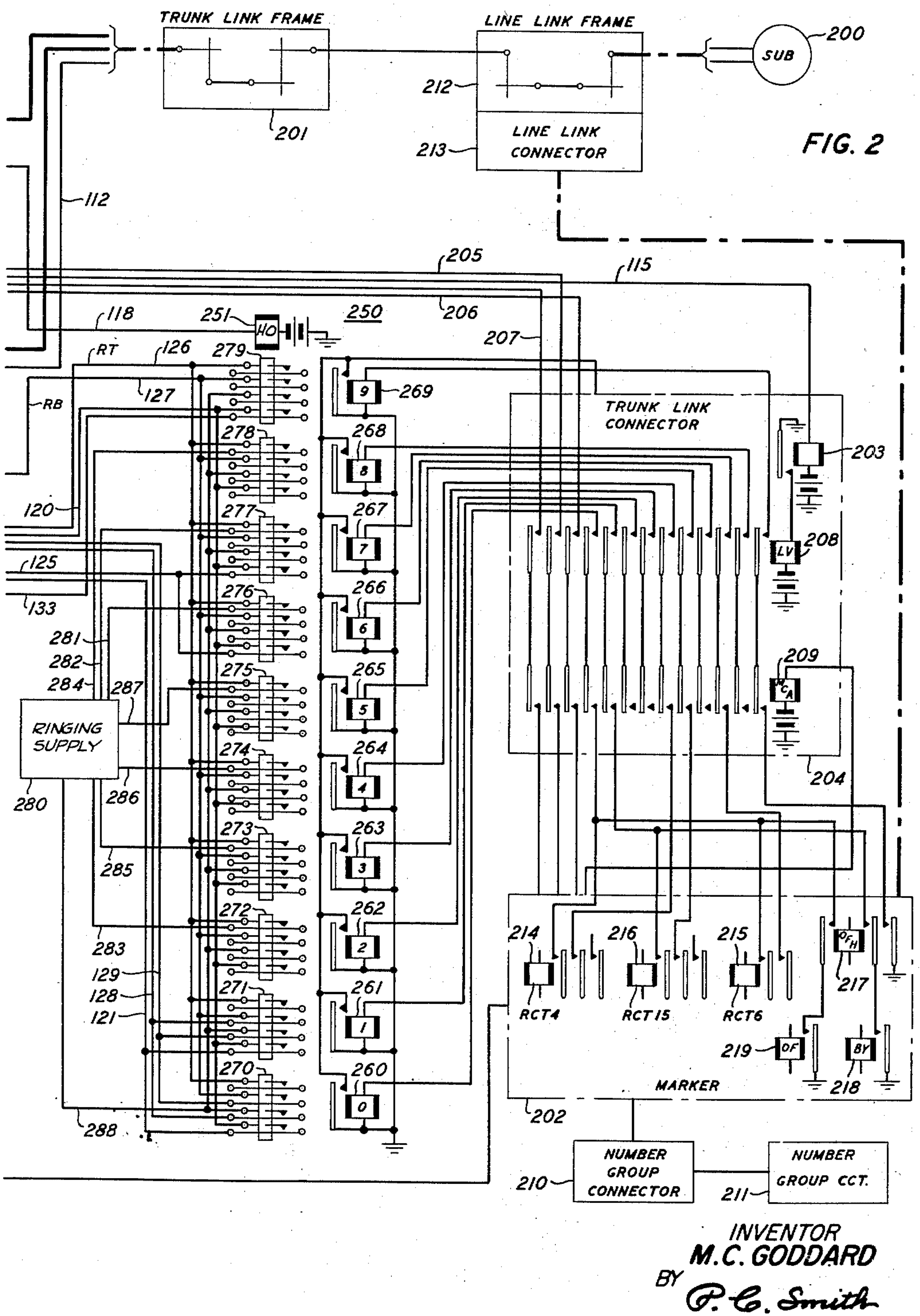

The novel features of the invention by which this object is attained are set forth in the appended claims and the invention as to its organization and its mode of operation will be best understood from the following detailed description when read in connection with the drawing in which:

Fig. 1 shows a trunk circuit incoming from a distant office, the schematic representation of a calling line and originating office in which such line terminates and the schematic representation of an incoming register, an incoming register link by which the register is associated with any one of a plurality of incoming trunk circuits, and a marker connector by which the incoming register is associated with an idle marker of the terminating office; and Fig. 2 shows schematically a marker, a number group circuit, number group connector, trunk link frame, trunk link connector, line link frame, line link connector and called line at the terminating office, and a ringing selection switch circuit in accordance with the present invention common to a group of trunk circuits, one of which trunk circuits is disclosed in Fig. 1.

For a complete discloseure of the invention, Fig. 2 should be placed to the right of Fig. 1.

The switches schematically disclosed in the boxes of Fig. 2 labeled "Trunk Link Frame" and "Line Link Frame" and the ringing selection switch of Fig. 2 are of the well-known cross bar type such as is disclosed for example in Patent 2,021,329, granted November 19, 1935, to J. N. Reynolds.

The circuits and apparatus schematically disclosed in Figs. 1 and 2 are fully disclosed and described in the application of A. J. Busch hereinbefore referred to and such portions of said application as are of assistance in the comprehension of the present invention are to be considered as embodied in the disclosure of this application.

An intra-office trunk circuit of the type served by the ringing selection switch circuit of Fig. 2 is disclosed in the copending application of L. T. Anderson and M. C. Goddard, Serial No. 57,387, now Patent No. 2,509,050, granted May 23, 1950, a revertive call trunk circuit of the type served by the ringing selection switch circuit is disclosed in the copending application of R. E. Hersey, Serial No. 57,397, filed October 29, 1948.

The invention will now be considered in detail. It will be assumed that the calling station designated 100 in Fig. 1 whose line, for example, terminates in a distant office 101, initiates a call, and that in response to the dialing of the office digits of the wanted line number, which line is designated 200 in Fig. 2 and terminates in a distant office of the cross bar type, the selector switches in the originating office establish a connection to an idle inter-office trunk circuit extending to the desired terminating office. This idle trunk circuit 143 terminates as the incoming trunk circuit of Fig. 1 at a cross-point of a trunk switch in the trunk link frame 201 of the terminating office.

When this trunk circuit is seized by the A relay 103 of the trunk circuit is operated in a circuit which may be traced in part from battery through the right winding of relay 103, the left No. 3 back contact of the CO relay 104, over the tip conductor 105 of the inter-office trunk, thence over the trunk loop, returning over the ring conductor 106, the left No. 4 back contact of relay 104 and through the left winding of relay 103 to ground. Relay 103 operates over this circuit and connects battery through resistor 107, over the lower back contact of the trunk reversal (T) relay 108, the right No. 2 back contact of the CO relay 104, the contacts for relay 103, the right No. 3 back contact of relay 104, and to the ST lead extending to the incoming register link circuit 108. If an incoming register is available, the register link switch operates to connect the idle register with the trunk circuit at which time the register takes control of the start lead ST and operates the CO relay 104 of the trunk circuit. It will be assumed that the incoming register 109 is idle and is instrumental in connecting ground to the CO lead thereby causing the operation of the CO relay 104 of the trunk circuit.

Relay 104 upon operating disconnects the windings of the A relay 103 from the conductors 105 and 106 of the inter-office trunk circuit 143 at its Nos. 3 and 4 left back contacts to provide a free pulsing path to the incoming register over the tip and ring leads T and R extending through the register link 108 to the reister 109, and prepares over its Nos. 2 and 3 right front contacts and the contacts of the A relay 103, a locking circuit for the D relay 110. Relay 104 also connects ground over its left No. 1 contacts to lead BL extending to the register 109 as a check of its operation.

When pulsing is completed, the register 109 connects ground to lead D thereby causing the operation of the D relay 110. Relay 110 upon operating connects the right winding of the A relay 103 over its upper No. 3 contacts and the upper back contact of the T relay 108 to the tip conductor 105 of the trunk circuit 143 and connects the left winding of relay 103 over the lower No. 4 contacts of relay 110 and the inner lower back contact of relay 108 to the ring conductor 106 of the trunk circuit 143 whereupon relay 103 reoperates and establishes the locking circuit for the D relay 110 which locking circuit may be traced from battery through the winding of relay 110, over the No. 3 right front contact of the CO relay 104, over the contacts of relay 103, the No. 2 right front contact of relay 104 and to ground over the lower No. 2 contacts of relay 110. Transmission current for the inter-office trunk is supplied through the windings of the A relay 103. Relay 110 also connects ground through the 10-ohm resistor 111, over its upper No. 1 contacts to the sleeve conductor 112 of the trunk appearance on the trunk link frame 201 for holding the trunk link and line link switches after the trunk link frame (F) relay 113 releases, and connects ground over its lower No. 1 and No. 3 contacts for holding other relays of the trunk circuit operated.

The incoming register following its seizure becomes connected to an idle marker through the marker connector 114. It will be assumed that the marker schematically disclosed in the dot-dash rectangle 202 of Fig. 2 is available and is seized. The marker reaches the trunk circuit through the marker connector 114, incoming register 109 and register link 108 and connects ground to the F lead thereby causing the operation of the F relay 113. Relay 113 upon operating connects ground to the FA lead 115 thereby causing the operation of relay 203 in the trunk link connector 204; closes the TC lead 205 from the trunk link connector, over its No. 3 left contacts and through the winding of the TC relay 116 and to battery; closes the RC lead 206 from the trunk link connector 204, over its No. 1 right contacts to the winding of the RC relay 117 and to battery; closes the circuit of the peg count register in the traffic register circuit 144 and at its right No. 2 transfer contacts transfers the control of the ringing selection switch hold magnet 251 over the TP lead 207 to the trunk link connector 204.

When the relay 203 of the trunk link connector 204 operates under the control of the trunk circuit, it prepares the circuit for operating the select magnet of the trunk link frame 201 corresponding to the level of the trunk switch in which the incoming trunk circuit has its appearance and causes the operation of the level (LV) relay 208 corresponding to such level which relay upon operating prepares to cut through leads from the trunk link connector, the ringing selection switch circuit and the trunk circuit to the marker. The marker 202 which has been seized having received the numerical digits dialed into the incoming register 109 and the number of the trunk link frame on which the incoming trunk circuit terminates, seizes the trunk link frame by operating the MCA relay 209 of the trunk link frame connector 204 allocated to the trunk link frame 201 whereupon control circuits prepared by the operation of the LV relay 208 are cut through to the marker.

When the marker seizes the trunk link frame it also seizes through the number group connector 210 the proper number group of the number group circuit in accordance with the thousands group of the number dialed into the incoming register 109 and sets the number group to determine the location of the desired line on the line link frame 212.

After the called line location has been obtained from the number group and the trunk link frame has been seized, the marker seizes the line link frame on which the called line terminates. It will be assumed that the line link frame 212 is seized through the line link connector 213. The called line 200 is then selected and tested for its idle or busy condition. If the called line is idle the marker interconnects the called line and the incoming trunk circuit of Fig. 1 by an idle channel. The marker tests to see what junctors are already in use on other calls. The lowest numbered available channel is chosen and the marker operates the select and hold magnets on the line link and trunk link frames 212 and 201 to establish the channel. If the called line is busy or all channels over which the called line may be reached are busy the calling subscriber is given a busy signal in the manner to be presently described.

The number group also gives the marker information for setting the ringing selection switch 250 of Fig. 2 for ringing the called subscriber if the called subscriber's line is idle by operating one of fifteen RCT relays of the marker, three of such relays RCT4, RCT6 and RCT15 being shown and designated 214, 215 and 216, respectively. The incoming trunk circuits appear on verticals of the ringing selection switch 250 as indicated by the hold magnets and different code leads appear in the horizontals. The marker, after receiving the required information from the number group and after an idle channel has been selected operates the selected hold magnet to connect the proper ringing into the trunk circuit. The marker then disconnects and leaves the ringing selection switch 250 held by the trunk circuit.

After the marker has operated the required select magnets of the ringing selection switch 250 over circuits extending through contacts of the selected RCT relay of the marker, contacts of the MCA relay 209 and contacts of the LV relay 208, ground is applied from the marker over a circuit extending over contacts of relays 209 and 208 to the RC lead 206 thereby causing the operation of the RC relay 117 of the trunk circuit. Relay 117 thereupon operates and establishes a circuit from ground applied at the marker over contacts of relays 209 and 208, the TP lead 207, the right No. 2 contacts of the F relay 113, the upper No. 3 contacts of relay 117, the H lead 118 and through the winding of hold magnet 251 of switch 250. Magnet 251 thereupon operates. In this connection it is to be noted that the other nine verticals of the switch 250 may be allocated to other incoming trunk circuits, to intra-office trunk circuits or to revertive call trunk circuits which have appearances on the same trunk link frame 201. It will be assumed that the RCT6 relay 215 of the marker has previously caused the operation of select magnet 266 allocated to the code 1 generator lead 281 for negative superimposed ringing which is to be applied for two seconds followed by a four-second silent interval. On the assumption that the called line is an individual line, the RCT6 relay 215 of the marker also establishes a circuit over contacts of relays 209 and 208 for the select magnet 260 indicative of this fact. With select magnet 260 operated and hold magnet 251 operated cross-point contacts 270 are closed and a hold circuit for the RC relay 117 is therefore established from battery through the winding and upper No. 1 contacts of relay 117, the back contact of ringing trip (RT) relay 119, conductor 120, the lower contacts of cross-point contacts 270, conductor 121 and to ground over the lower No. 3 contacts of the D relay 110. This locking ground provides a check to the marker that the RC relay 117 has operated and cross-point contacts of switch 250 and the back contact of the ringing trip relay 119 are closed.

On a charge call the marker connects ground over the contacts of relays 209 and 208, and over the TC lead 205 for operating the TC relay 116 which, upon operating, locks over its No. 1 right contacts, the No. 4 left back contact of the BY relay 122 and to ground over the lower No. 3 contacts of the D relay 110.

When the marker has set up the connection to the called line and has completed the necessary tests it releases the F relay 113 thereby releasing relay 203 at the trunk link connector and returns the control of the hold magnet 251 of the ringing selection switch 250 to the trunk circuit. Hold magnet 251 is now maintained operated over conductor 118, the upper No. 3 contacts of the RC relay 117, the right No. 2 normal contacts of relay 113 and to ground over the lower No. 3 contacts of the D relay 110. The tip and ring conductors of the trunk circuit 102 are now extended over the cross-points of switches on the trunk link frame 201 and line link frame 212 to the tip and ring conductors of the called line 200 and the sleeve conductor 112 for holding the established connection to the called line is under the control of the D relay 110. The incoming register 109 and register link 108 are also disconnected at this time.

Relay 113 connects interrupted ground from the pick-up supply lead 123 over its No. 3 right back contact, over the No. 3 right back contact of the BY relay 122, the lower No. 1 contacts of the RC relay 117, through the left normal contacts of pick-up (PU) relay 124 to the pick-up lead 125 extending to the ringing selection switch 250, and thence over the upper No. 2 contacts of the RC relay 117, the upper No. 2 contacts of the D relay 110 and through the winding of PU relay 124 to battery. However, when the call is for a "one ring" station, as has been assumed, the PU relay 124 is immediately operated without awaiting the closure of the interrupter contacts at the pick-up supply source, over lead 125 connected over the lower contacts of operated cross-point contacts 276 and the lower contacts of operated cross-point contacts 270 to ground on conductor 121, as soon as such cross-points close. Relay 124, upon operating, locks over the circuit traced from its winding to conductor 125, thence over the left alternate contacts of relay 124 to ground applied to conductor 121 over the lower No. 3 contacts of the D relay 110; clears the lead 125 of interrupted ground from the interrupter lead 123 and connects the selected ringing source to the called line.

Ringing current is now connected to the called line from the ringing current supply 280 over code 1 generator lead 281, over the upper contacts of cross-point contacts 276, the RT lead 126, through the winding of ringing trip (RT) relay 119, the RB lead 127, the next-to-upper contacts of cross-point contacts 270, the ring conductor 129, the outer right contacts of PU relay 124, the lower No. 2 front contact of the RC relay 117, over the ring conductor of the established connection to the called line 200, thence returning over the tip conductor of the established connection, over the upper No. 4 front contact of relay 117, the inner right contacts of relay 124, tip conductor 128, the next-to-lower contacts of cross-point contacts 270 and conductor 288 to the ringing ground of the ringing supply 280. At the same time ringing current is supplied through condensers 130 and 131, back over the established connection to the calling subscriber's line as an audible ringing tone signal.

If the call is not for a "one-ring" station, the pick-up relay does not receive a direct operating ground over cross-points of the ringing selection switch 250 as just described, but awaits a ground connection over the right No. 3 back contact of the F relay 113 to insure that machine ringing will not start until the beginning of a ringing code.

Should the call be abandoned before the called subscriber answers, the A relay 103 releases in turn releasing the D relay 110 which in turn releases the PU relay 124 and the RC relay 117 to restore the trunk circuit and the associated ringing selection switch circuit.

When the called subscriber answers the increased current flow during the ringing or silent period voltage operates the ringing trip (RT) relay 119 thereby causing the release of the RC relay 117. Relay 117 upon releasing opens the circuit over which ringing current was applied to the called line and the RT relay 119 releases. With relay 117 released the upper winding of the S relay 132 is connected over the upper No. 4 back contact of relay 117 to the tip conductor of the established connection to the called line 200 and the lower winding of relay 132 is connected over the lower No. 2 back contact of relay 117 to the ring conductor of the established connection whereupon relay 132 operates. Relay 117 at its upper No. 2 contacts opens the locking circuit of the PU relay 124 which releases and at its upper No. 3 contacts opens the circuit of holding magnet 251 of the ringing selection switch 250 thereby releasing the vertical of such switch used in conjunction with the trunk circuit of Fig. 1.

The S relay at its lower contacts establishes a new holding ground circuit through the 10-ohm resistor 111 and over the lower No. 3 back contact of the RC relay 117 to sleeve conductor 112 for holding the established connection to the called line and establishes the circuit of the reversing (T) relay 108 if the TC relay 116 has been operated from the marker, over a circuit which may be traced from battery through the winding of relay 108, over the right No. 2 back contact of the BY relay 122, over the left No. 1 contacts of the TC relay 116, over the right No. 1 contacts of the CO relay 104 and to ground over the upper contacts of the S relay 132. Relay 108 if it operates reverses the battery and ground connection between the windings of the A relay 103 and the tip and ring conductors 105 and 106 of the inter-office trunk 143 for supervision at the originating office.

In the preceding discussion, it was assumed that the called line when tested was found to be idle. It will now be assumed that the called line was found to be busy. Under this condition the OFH relay 217 and the BY relay 218 of the marker are operated and a circuit is closed over contacts of such relays, over contacts of the MCA relay 209 and the LV relay 208 at the trunk link connector 204, for the select magnet 269 indicative of the busy condition, a circuit is also established for operating the select magnet 261 indicative of a called line busy condition and a circuit for the RC relay 117 of the trunk circuit is established. When, following the operation of relay 117, the hold magnet 251 is operated as previously described, the cross-point contacts 271 and 279 are operated and a circuit is established from battery through the winding of the relay 122 of the trunk circuit, over the BY lead 133, the lower contacts of cross-point contacts 279, the lower contacts of cross-point contacts 271, conductor 121 and to ground over the lower No. 3 contacts of the D relay 110. Relay 122 thereupon operates and locks over its left No. 1 contacts to ground on conductor 121. The RC relay 117 upon operating locks in a circuit over its upper No. 1 contacts, the back contact of ringing trip relay 119, conductor 120 and the lower contacts of cross-point contacts 271 to ground on conductor 121.

With the BY relay 122 operated, the start (STB) lead 134 from the interrupter circuit 135 is connected over the left No. 3 back contact of relay 116 and the left No. 3 contacts of relay 122 to ground to start the 60 impulse per minute transmission from the interrupter circuit and the LBT or tone lead 136 is connected over the right No. 2 back contact of relay 116 and the right No. 1 contacts of relay 122 through condenser 142 and the left winding of the A relay 103 to ground. Tone current is thereby induced into the transmission circuit extending over the calling line loop whereby the calling subscriber hears the busy tone. When line busy flash is required the circuit of the T relay 108 is interrupted at 60 impulses per minute. This circuit extends from battery through the winding of such relay, over the No. 2 right front contact of the BY relay 122, the left No. 2 back contact of the TC relay 116 and over the LB lead 137 to interrupted ground.

If the marker is unable to complete the call because an idle channel is not available, the OFH relay 217 and the OF relay 219 of the marker are operated and cause the operation of select magnets 260 and 269 and the operation of the RC relay 117 over contacts of the LV relay 208 and MCA relay 209 of the trunk link connector. When, following the operation of the relay 117 the hold magnet 251 of the ringing selection switch 250 is operated as previously described, the cross-point contacts 270 and 271 are operated and a circuit is established from battery through the winding of the relay 122 of the trunk circuit over the BY lead 133, the lower contacts of cross-point contacts 279, the lower contacts of cross-point contacts 270, conductor 121 and to ground over the lower No. 3 contacts of the D relay 110. Relay 122 thereupon operates and locks over its left No. 1 contacts to ground on conductor 121. The RC relay 117 upon operating locks over a circuit over its upper No. 1 contacts, the back contact of the ringing trip relay 119, conductor 120 and the lower contacts of cross-point contacts 270 and to ground on conductor 121. Relay 122 upon operating now establishes a circuit from battery through the winding of the TC relay 116, over the left No. 2 contacts of relay 122, conductor 128 and the next to lower contacts of operated cross-point contacts 270 to ground on the ringing supply ground lead 288. Relay 116 now operates and locks over its right No. 1 contacts and the left No. 4 front contact of the BY relay 122 to ground.

With the BY relay 122 and the TC relay 116 both operated, the start (STO) lead 138 to the interrupter circuit 135 is connected over the left No. 3 front contact of relay 116 and the left No. 3 contacts of relay 122 to ground to start the 120 impulse per minute transmission from the interrupter circuit and the overflow tone (OFT) lead 139 is connected over the right No. 2 front contact of relay 116 and the right No. 1 contacts of relay 122, through condenser 142 and the left winding of the A relay 103 to ground. Tone current is induced into the transmission circuit extending over the calling line loop whereby the calling subscriber hears the overflow busy tone. When a flashing signal is also required the circuit of relay 108 is interrupted at 120 impulses per minute. This circuit extends from battery through the winding of such relay, over the No. 2 right front contact of the BY relay 122 and the left No. 2 front contact of the TC relay 116 to the interrupter OF ground lead 140 extending to the interrupter circuit.

If the calling subscriber is first to disconnect, the trunk loop becomes opened thereby releasing the A relay 103 followed by the release of the D relay 110. Relay 110 in turn releases the CO relay 104 and the TC relay 116 if previously operated. The T relay 108 releases when either the CO relay 104 or the TC relay 116 releases. With the CO relay 104 released, the windings of the A relay 103 are reconnected to the conductors 105 and 106 of the incoming trunk circuit 102 in their normal polarity direction, but the trunk loop being open at this time relay 103 does not operate. The D relay 110 upon releasing opens the transmission path from the windings of the A relay 103 to the incoming trunk circuit and over its upper Nos. 4 and 5 back contacts connects the windings of the S relay 132 to the tip and ring conductors of the established connection to the called line 200 to hold relay 132 over the line loop following the subsequent operation of the RC relay 117.

The sleeve ground to sleeve conductor 112 for holding the established connection to the called line is now maintained through resistor 111 over the lower contacts of the S relay 132 at the lower No. 3 back contact of the RC relay 117 until the called subscriber hangs up to release the S relay 132 or the RC relay 117 operates upon a time-out.

With relay 132 operated and the CO relay 104 released, a circuit is established from battery through the winding of heater unit 141, over the right No. 1 normal contacts of the CO relay 104 and to ground over the upper contacts of the S relay 132 and after an interval of about fifteen seconds the contacts of the heater unit close to establish a circuit from battery through the winding of the RC relay 117, contacts of heater unit 141, the left No. 2 back contact of the CO relay 104 and to ground over the upper contacts of the S relay 132. Relay 117 upon operating disconnects ground from the sleeve lead 112 at its lower No. 3 back contact thereby releasing the switches on the trunk link frame 201 and on the line link frame 212. When the release of such switches has taken place and the disconnection of the called subscriber line 200 from the trunk circuit has become effective, the S relay 132 releases in turn releasing the heater unit 141 and the RC relay 117.

If the trunk circuit is reselected during the timed release of the called subscriber's line, the A relay 103 reoperates causing an incoming register to be attached to the trunk circuit as previously described. However, when the CO relay 104 operates it opens the circuit through the winding and contacts of the heater unit 141 to prevent the operation of the RC relay 117.

Should the called subscriber disconnect at any time before the operation of the D relay 110, the called line will be released at once since with relay 132 released and relay 110 unoperated no resistance ground is applied to sleeve conductor 112 to hold the cross bar switches. After the D relay 110 operates and applies resistance ground to sleeve conductor 112, the called line will be released and the cross bar switches released when the marker operates the F relay 113 of the trunk circuit and thereby operates relay 203 of the trunk link connector.

When the called subscriber 200 disconnects first the S relay 132 upon releasing releases the T relay 108 to reverse the trunk circuit as a supervisory signal. The connection to the called line is then held by resistance ground connected to sleeve conductor 112 by the operated D relay 110 until the calling end of the trunk circuit is released either by time-out at the distant office or disconnection by the calling subscriber. The A relay 103, CO relay 104, and D relay 110 then release restoring the trunk circuit to normal.

In the preceding discussion it was assumed that the ringing current required to ring on the individual line 200 was applicable over the cross-point contacts 276 and 270 of the ringing control switch 250 from the code 1 generator lead 281. For calls to two-party lines the marker operates select magnet 266 to close cross-point contacts 276 and in addition operates select magnet 261 to close cross-point contacts 271 if the wanted subscriber is a tip party and the ringing current is to be applied over the tip conductor of the called line or operates select magnet 260 to close cross-point contacts 270 if the wanted subscriber is a ring party and the ringing current is to be applied over the ring conductor of the called line.

If the called subscriber is a substation of a four-party semiselective, a four-party full selective, an eight-party semiselective, or a ten-party five-code line, and is to be signaled by one long ring of negative superimposed ringing current, the marker will operate to select magnet 266 to close the cross-point contacts 276 and will, in addition, operate either select magnet 261 or 260 to close either cross-point contacts 271 or 270 dependent upon whether the substation to be called is to be rung over the tip or ring conductor of the line. With the cross-point contacts 276 closed and cross-point contacts 271 also closed, code ringing is supplied from the ringing supply source 280 over the code generator lead 281, the upper contacts of cross-point contacts 276, lead 126, the winding of ringing trip relay 119, lead 127, the next to upper contacts of cross-point contacts 271, conductor 128, the inner right contacts of the PU relay 124, the upper No. 4 front contact of the RC relay 117 and over the tip conductor of the established connection to the called line, thence through the ringers on the tip side of the line to ground. With the cross-point contacts 276 and 270 closed, code ringing is supplied from the ringing supply source 280 over the code generator lead 281, the upper contacts of cross-point contacts 276, lead 126, winding of ringing trip relay 119, lead 127, the next to upper contacts of cross-point contacts 270, conductor 129, the outer right contacts of PU relay 124, the lower No. 2 front contact of the RC relay 117 and over the ring conductor of the established connection to the called line, thence through the ringers on the ring side of the line to ground. Thus ringing current of the negative superimposed type is supplied and the ringing which starts immediately after the pick-up interval determined by the pick-up interrupter connected to lead 123 is on for two seconds and then off for the remaining four seconds of the ringing interval.

If the ringing current is applied to the tip of a four-party full selective line, only the negatively polarized ringer on the tip side will respond to call the subscriber at that substation or if applied to the tip of an eight-party semiselective line only the two negatively polarized ringers connected to the tip side will respond and since the code is a single long ring, only one of the subscribers thus rung will recognize it as his ringing code signal. If the ringing current is applied to the tip of a four-party semiselective line, both ringers on the tip side will respond, but since the signal is a single long ring, only one of the two tip party subscribers will recognize it as his ringing code signal. If the ringing current is applied to the tip of a ten-party five-code line all five of the ringers on the tip side of the line will respond, but since the signal is a single long ring, only one of the five subscribers who may hear the ring will recognize it as his ringing code signal.

If the ringing current is applied to the ring of a four-party full selective line, only the negatively polarized ringer on the ring side will respond to call the subscriber at that substation or if applied to the ring side of an eight-party semiselective line only the two negatively polarized ringers connected to the ring side will respond and since the code is a single long ring only one of the subscribers thus rung will recognize it as his ringing code signal. If the ringing current is applied to the ring of a four-party semi-selective line both ringers on the ring side will respond, but since the signal is a single long ring, only one of the two subscribers thus rung will recognize it as his ringing code signal. If the ringing current is applied to the ring of a ten-party five-code line all five of the ringers on the ring side of the line will respond, but since the signal is a single long ring, only one of the five subscribers who may hear the ring will recognize it as his ringing code signal.

If the called subscriber is at a substation on a four-party full selective or eight-party semiselective line and is to be signaled by one long ring of positive superimposed ringing current, the marker will operate the select magnet 267 to close the cross-point contacts 277 and will, in addition, operate either select magnet 261 or 260 to close either cross-point contacts 271 or 270 dependent upon whether the subscriber to be called is to be rung over the tip or over the ring conductor of the line. With the cross-point contacts 277 closed ringing current from the ringing supply 280 is applied over the code +1 generator lead 282, over the upper contacts of cross-point contacts 277 and thence as traced to either the tip or ring conductor of the called line dependent upon whether the tip cross-point contacts 271 or the ring cross-point contacts 270 have been closed. Ringing current in this case is positive superimposed and is supplied for two seconds followed by a four-second silent interval. If the ringing current is applied to the tip of a four-party full selective line, only the positively polarized ringer on the tip side of the line will respond to call the subscriber at that substation or if applied to the ring of such line only the positively polarized ringer on the ring side of the line will respond to call the subscriber at that substation. If the ringing current is applied to the tip of an eight-party semiselective line only the two positively polarized ringers on the tip side of the line will respond, but since the code is a single long ring, only one of the subscribers thus rung will recognize it as his ringing code signal or, if the ringing current is applied to the ring of such line only the two positively polarized ringers on the ring side of the line will respond, but since the code is a single long ring, only one of the subscribers thus rung will recognize it as his ringing code signal.

If the called subscriber is at a substation on a four-party semiselective line, on an eight-party semiselective line, or on a ten-party five-code line, and is to be signaled by two short rings of negative superimposed ringing current, the marker will operate the select magnet 262 to close the cross-point contacts 272 and will, in addition, operate either select magnet 261 or 260 to close either cross-point contacts 271 or 270 dependent upon whether the substation to be called is to be rung over the tip or over the ring conductor of the line. With the cross-point contacts 272 closed, ringing current from the ringing supply 280 is applied over the code 2 generator lead 283, over the upper contacts of cross-point contacts 272 and thence as traced to either the tip or ring conductor of the called line dependent upon whether the tip cross-point contacts 271 or the ring cross-point contacts 270 have been closed. Ringing current in this case is negative superimposed and is supplied for one second, off for one second, on again for one second and off for the remaining three seconds of the ringing interval, and thus a two short ring code is supplied. If the ringing current is applied to the tip of a four-party semiselective line, the two ringers connected to the tip of the line will respond, but since the ringing code is two short rings, only one of the two subscribers thus rung will recognize it as his ringing code signal. If the current is applied to the ring of such line the two ringers connected to the ring of the line will respond, but since the ringing code is two short rings, only one of the two subscribers thus rung will recognize it as his ringing code signal. If the current is applied to the tip of an eight-party semiselective line, the two negatively polarized ringers on the tip side will respond, but since the ringing code is two short rings, only one of the two subscribers thus rung will recognize it as his ringing code signal, or, if the current is applied to the ring of such line the two negatively polarized ringers on the ring side will respond, but since the ringing code is two short rings, only one of the two subscribers thus rung will recognize it as his ringing code signal. If the ringing current is applied to the tip of a ten-party five-code line all of the ringers on the tip side of the line will respond but only one of the five subscribers thus rung will recognize the ring as his ringing code signal, or if the ringing current is applied to the ring of such line, all of the ringers on the ring side of the line will respond but only one of the five subscribers thus rung will recognize the ring as his ringing code signal.

If the called subscriber is on an eight-party semiselective line and is to be signaled by two short rings of positive superimposed ringing current, the marker will operate the select magnet 268 to close the cross-point contacts 278 and in addition will operate either select magnet 261 or 260 to close either cross-point contacts 271 or 270 dependent upon whether the substation to be called is to be rung over the tip or over the ring conductor of the line. With the cross-point contacts 278 closed, ringing current from the ringing supply 280 is applied over the code 2+ lead 284, over the upper contacts of cross-point contacts 278 and thence as traced to either the tip or ring conductor of the called line dependent upon whether the tip cross-point contacts 271 or the ring cross-point contacts 270 have been closed. Ringing current in this case is positive superimposed and is supplied for one second, off for one second, on again for one second and off for the remaining three seconds of the ringing interval, and thus a two-short ring code is supplied. If the ringing current is applied to the tip side of the line the two positively polarized ringers connected to the tip side of the line will respond, but since the ringing code is two short rings, only one of the two subscribers thus rung will recognize it as his ringing code signal, or if the current is applied to the ring side of the line then the two positively polarized ringers connected to the ring side of the line will respond, but since the ringing code is two short rings, only one of the two subscribers thus rung will recognize it as his ringing code signal.

If the called subscriber is on a ten-party five-code line, the marker will operate either the select magnet 263, 264 or 265 to cause the closure of either the cross-point contacts 273, 274 or 275, dependent upon whether the party to be called has a ringing code of one long followed by one short ring, a code of one long followed by two short rings, or a code of one long ring followed by one short ring and a second long ring. In addition, the marker will cause the closure of the tip cross-point contacts 271 or the ring cross-point contacts 270 through the operation of select magnet 261 or 260 dependent upon whether the called subscriber is at a tip or ring substation. If the called subscriber is to be signaled with a ringing code of one long ring followed by a single short ring, the closure of cross-point contacts 273 establishes a ringing circuit from the ringing supply 280 over the code 3 generator lead 285, over the upper contacts of cross-point contacts 273, thence as traced to the tip or ring conductor of the called line dependent upon whether the tip cross-point contacts 271 or the ring cross-point contacts 270 have been closed. Ringing current in this case is negative superimposed and is applied for one and one-half seconds, off for one-half second, on for one-half second and off for the remaining three and one-half seconds of the ringing interval. If the ringing current is applied to the tip side of the line, the five ringers on the tip side will respond, but only one of the subscribers thus rung will recognize the ring as his ringing code signal, or if the ringing current is applied to the ring side of the line, the five ringers on the ring side will respond, but only one of the subscribers thus rung will recognize the ring as his ringing code signal. If the called subscriber is to be signaled with a ringing code of one long followed by two short rings, the closure of cross-point contacts 274 establishes a ringing circuit from the ringing supply 280, over the code 4 generator lead 286, over the upper contacts of cross-point contacts 274, thence as traced to the tip or ring conductor of the called line dependent upon whether the tip cross-point contacts 271 or the ring cross-point contacts 270 have been closed. Ringing current in this case is negative superimposed and is applied for one and one-half seconds, off for one-half second, on for one-half second, on another half second and off for the remaining two and one-half seconds of the ringing interval. If the ringing current is applied to the tip side of the line, the five ringers on the tip side will respond but only one of the subscribers thus rung will recognize the ring as his ringing code signal, or if the ringing current is applied to the ring side of the line, the five ringers on the ring side will respond but only one of the subscribers thus rung will recognize the ring as his ringing signal. If the called substation is to be signaled with a ringing code of one long, one short and another long ring, the closure of cross-point contacts 275 establishes a ringing circuit from the ringing supply 280 over the code 5 generator lead 287, over the upper contacts of cross-point contacts 275, thence as traced to the tip or ring conductor of the called line, dependent upon whether the tip cross-point contacts 271 or the ring cross-point contacts 270 have been closed. Ringing current in this case is negative superimposed and is applied for one and one-half seconds, off one-half second, on one-half second, off one-half second, on one and one-half seconds and off for the remaining one and one-half seconds of the ringing interval. If the ringing current is supplied to the tip side of the line, the five ringers on the tip side will respond but only one of the subscribers thus rung will recognize the ring as his ringing code signal, or if the ringing current is applied to the ring side of the line, the five ringers on the ring side will respond but only one of the subscribers thus rung will recognize the ring as his ringing signal.

To recapitulate, the selection of ringing current for ringing any subscriber on any one of the types of lines above discussed is in accordance with the following table:

*Ringing selection table*

| Marker Relay | Select Magnet | Polarity | 2Party | Code Ringing Impulses | | | |
|---|---|---|---|---|---|---|---|
| | | | | 4 party Semi-selective | 4 party Full Selective | 8 party Semi-selective | 10 party, 5 code |
| RCT 11 | 276<br>271 | — | — | — | — | — | — |
| RCT 1 | 276<br>270 | — | — | — | — | — | — |
| RCT 7 | 277<br>270 | + | | | — | — | |
| RCT 6 | 277<br>270 | + | | | — | — | |
| RCT 12 | 272<br>271 | — | | - - | | - - | - - |
| RCT 2 | 272<br>270 | — | | - - | | - - | - - |
| RCT 9 | 278<br>671 | + | | | | | |
| RCT 8 | 278<br>270 | + | | | | - -<br>- - | |
| RCT 13 | 273<br>271 | — | | | | | — - |
| RCT 3 | 273<br>270 | — | | | | | — - |
| RCT 14 | 274<br>271 | — | | | | | — - - |
| RCT 4 | 274<br>270 | — | | | | | — - - |
| RCT 15 | 275<br>271 | — | | | | | — - — |
| RCT 5 | 275<br>270 | — | | | | | — - — |

What is claimed is:

1. In a telephone system, a trunk circuit, a common control means for controlling the establishment of a telephone connection including said trunk circuit, a cross bar switch comprising a plurality of cross-point contact sets, a plurality of sources of ringing current connected to said contact sets, means under the control of said common control means to prepare a plurality of said contact sets to select one of said sources of ringing current, and means under the joint control of said common control means and said trunk circuit to close said prepared contact sets to connect said selected source of ringing current to said trunk circuit.

2. In a telephone system, a plurality of trunk circuits, a common control means for controlling the establishment of a telephone connection including any one of said trunk circuits, a plurality of sources of ringing current, a cross bar switch comprising a plurality of coordinately arranged cross-point contact sets, the contact sets in the several rows in one coordinate direction being connected to said trunk circuits respectively and the contact sets in the several rows in the other coordinate direction being connected to said sources of ringing current, respectively, means under the control of said common control means to prepare a plurality of said contact sets to select one of said sources of ringing current, and means under the joint control of said common control means and said selected trunk circuit to close said prepared contact sets to connect said selected source of ringing current to said trunk circuit.

3. In a telephone system, a plurality of trunk circuits, a common control means for controlling the establishment of a telephone connection including any one of said trunk circuits, a plurality of sources of ringing current, a cross bar switch comprising a plurality of coordinately arranged cross-point contact sets, the contact sets in the several rows in one coordinate direction being connected to said trunk circuits respectively and the contact sets in the other coordinate direction being connected to said sources of ringing current, respectively, select magnets operable under the control of said common control means to prepare a plurality of said contact sets to select one of said sources of ringing current, and a hold magnet under the joint control of said common control means and said selected trunk circuit to close said prepared contact sets to connect said selected source of ringing current to said trunk circuit.

4. In a telephone system, a trunk circuit having a tip and a ring conductor, a common control means for controlling the establishment of a telephone connection including said trunk circuit, a cross bar switch comprising a plurality of cross-point contact sets, a plurality of sources of ringing current connected to certain of said contact sets, the tip and ring conductors of said trunk circuits being connected to others of said contact sets, means under the control of said common control means to prepare one of said certain contact sets to select one of said sources of ringing current and to prepare one of said latter contact sets to determine the application of the selected ringing current to either the tip or ring conductor of said trunk circuit, and means under the joint control of said common control means and said trunk circuit to close said prepared contact sets to connect said selected source of ringing current to the tip or ring conductor of said trunk circuit.

5. In a telephone system, a plurality of trunk circuits each having a tip and a ring conductor, a common control means for controlling the establishment of a telephone connection including any one of said trunk circuits, a plurality of sources of ringing current, a cross bar switch comprising a plurality of coordinately arranged cross-point contact sets, the contact sets in the several rows in one coordinate direction being connected to said trunk circuits respectively, the contact sets in certain rows in the other coordinate direction being connected to said sources of ringing current respectively and the contact sets in other rows in the latter coordinate direction being connected to determine the application of any selected ringing current source to either the tip or ring conductor of any one of said trunk circuits, means under the control of said common control means to prepare a contact set in one of said certain rows and a contact set in one of said latter rows to select one of said sources of ringing current and to determine the application thereof to either the tip or ring conductor of any of said trunk circuits, and means under the joint control of said common control means and a selected trunk circuit to close said prepared contact sets to connect said selected source of ringing current to the tip or ring conductor of said selected trunk circuit.

6. In a telephone system, a trunk circuit, a common control means for controlling the establishment of a telephone connection including said trunk circuit, a cross bar switch comprising a plurality of cross-point contact sets, a plurality of sources of ringing current associated with said contact sets, certain of which sources are of the code ringing type, means under the control of said common control means to prepare a plurality of said contact sets to select one of said sources of ringing current, means under the joint control of said common control means and said trunk circuit to close said prepared contact sets, a pick-up relay in said trunk circuit for applying selected ringing current to said trunk circuit, a ringing interrupter effective to cause the operation of said relay at the beginning of a ringing code cycle where ringing current of the code ringing type is selected for application to said trunk circuit, and means controlled over a closed cross-point contact set of said switch to operate said relay independent of said interrupter when a ringing current source of the one-ring type is selected for application to said trunk circuit.

7. In a telephone system, a trunk circuit having a tip and a ring conductor, a common control means for controlling the establishment of a telephone connection including said trunk circuit, a cross bar switch comprising a plurality of cross-point contact sets, a plurality of sources of ringing current associated with certain of said contact sets, certain of which sources are of the code ringing type, the tip and ring conductors of said trunk circuit being associated with others of said contact sets, means under the control of said common control means to prepare one of said certain contact sets to select one of said sources of ringing current and one of said latter contact sets to determine the application thereof to either the tip or ring conductor of said trunk circuit, means under the joint control of said common control means and said trunk circuit to close said prepared contact sets, a pick-up relay in said trunk circuit for applying selected ringing current to said trunk circuit, a ringing interrupter effective to cause the operation of said relay at the beginning of a ringing code cycle when ringing current of the code ringing type is selected for application to said trunk circuit, and means controlled over a cross-point contact set closed to select a ringing current source of the one-ring type to operate said relay independent of said interrupter to cause the immediate application of ringing current to said trunk circuit.

8. In a telephone system, a called line, a trunk circuit, a common control means for controlling the establishment of a telephone connection to said called line including said trunk circuit, a cross bar switch comprising a plurality of cross-point contact sets, a plurality of sources of ringing current associated with certain of said contact sets, a source of busy tone current, a relay in said trunk circuit for applying current from said sources to said trunk circuit, a circuit for said relay controllable over another of said cross-point contact sets, means in said common control means for determining the idle or busy condition of said called line, means under the control of said common control means to prepare a plurality of said certain contact sets to select one of said sources of ringing current if said line is found to be idle and to prepare said other contact set if said line is found to be busy, and means under the joint control of said common control means and said trunk circuit to close said prepared contact sets to connect said selected source of ringing current or said source of busy tone current to said trunk circuit.

9. In a telephone system, a called line, a plurality of trunk circuits each having a tip and a ring conductor, switching means, a common control means for controlling said switching means to establish a telephone connection to said called line including any one of said trunk circuits, a source of busy tone current, sources of ringing current, a relay in each trunk circuit for applying current from said source to conductors of said trunk circuit, a cross bar switch comprising a plurality of coordinately arranged cross-point contact sets, the contact sets in the several rows in one coordinate direction being allocated to said trunk circuits respectively, the contact sets in certain rows in the other coordinate direction being allocated to the selection of said sources of ringing current respectively, the contact sets in two other rows in the latter coordinate direction being allocated to determine the application of any selected ringing current source to either the tip or ring conductor of any one of said trunk circuits and a further row in the latter coordinate direction being allocated to the operation of the busy relay of any one of said trunk circuits, means in said common control means for determining the idle or busy condition of said called line, means under the control of said common control means to prepare a contact set in said certain rows and a contact set in one of said two rows to select one of said sources of ringing current if said called line is found to be idle or to prepare a contact set in said further row and a contact set in one of said two rows to operate the busy relay of a selected trunk circuit if said called line is found to be busy, and means under the joint control of said common control means and said selected trunk circuit to close said prepared contact sets to connect said selected source of ringing current or said source of busy tone current to said selected trunk circuit.

MYRON C. GODDARD.

REFERENCES CITED

The following references are of record in the file of this patent:

UNITED STATES PATENTS

| Number | Name | Date |
|---|---|---|
| 2,120,419 | Stokely | June 14, 1938 |
| 2,430,316 | Voss | Nov. 4, 1947 |